(12) United States Patent
Nulph et al.

(10) Patent No.: US 12,520,777 B1
(45) Date of Patent: Jan. 13, 2026

(54) CORNER-SPRINKLER APPARATUS

(71) Applicant: Nulph Industries, Inc., American Falls, ID (US)

(72) Inventors: Raymond Nulph, American Falls, ID (US); Pedro Rodriguez Hernandez, American Falls, ID (US); Eduardo Carlos, American Falls, ID (US)

( * ) Notice: Subject to any disclaimer, the term of this patent is extended or adjusted under 35 U.S.C. 154(b) by 0 days.

(21) Appl. No.: 19/311,166

(22) Filed: Aug. 27, 2025

(51) Int. Cl.
*A01G 25/09* (2006.01)

(52) U.S. Cl.
CPC ................ *A01G 25/09* (2013.01)

(58) Field of Classification Search
CPC .............. A01G 25/09; B05B 13/005
USPC ............ 239/722, 723, 741, 743–749
See application file for complete search history.

(56) References Cited

U.S. PATENT DOCUMENTS

| | | | | |
|---|---|---|---|---|
| 2,683,056 A * | 7/1954 | Hilfinger | ............. | A01G 25/095 239/748 |
| 3,147,764 A * | 9/1964 | Jensen | ............. | F16C 33/60 475/346 |
| 3,583,636 A * | 6/1971 | Lacey | ............. | A01G 25/095 239/745 |
| 5,622,319 A * | 4/1997 | Babb | ............. | B65H 75/4463 137/355.27 |
| 6,604,697 B1 * | 8/2003 | Heren | ............. | A01G 25/09 239/722 |
| 7,182,274 B2 * | 2/2007 | Nies | ............. | B65H 75/4478 239/747 |
| 2002/0030128 A1 * | 3/2002 | Reid | ............. | B05B 3/16 239/722 |
| 2005/0077401 A1 * | 4/2005 | Sinden | ............. | A01G 25/097 239/722 |
| 2014/0261574 A1 * | 9/2014 | Tebbens | ............. | F23J 3/00 239/722 |
| 2016/0120117 A1 * | 5/2016 | Lawrence | ............. | A01C 23/008 239/164 |
| 2021/0354151 A1 * | 11/2021 | Rodes | ............. | B05B 3/18 |

* cited by examiner

*Primary Examiner* — Cody J Lieuwen

(57) ABSTRACT

A corner-sprinkler apparatus includes a first wheel, a second wheel, a first member interposed between the first and second wheels, a first bracket coupled to the first member, and a second member with a second bracket, the second member may be perpendicular to the first member. The second member may be configured to receive a sprinkler head and a water hose or pipe. The corner-sprinkler apparatus may be easily transported and positioned in hard-to-reach sections of a field, where water is not easily distributed.

1 Claim, 7 Drawing Sheets

CORNER-SPRINKLER APPARATUS

CROSS-REFERENCE TO RELATED APPLICATIONS

Not applicable.

TECHNICAL FIELD

The present disclosure relates to an irrigation apparatus. More particularly, the present disclosure relates to an irrigation apparatus that is used for difficult to reach portions of fields.

BACKGROUND

Irrigation has been a common practice for thousands of years and has been important in sustaining humanity. Early irrigation was performed via buckets with water and diverted waterways (e.g., canals), to name a few approaches. Due to enhancements in technology, many have been able to water vast amounts of lands efficiently and consistently. Some of these improvements include the introduction of the sprinkler in the 1800s and later wheel and hand line irrigation systems, as well as center pivot irrigation systems. All of these improvements have been extremely important for increasing crop production and in aiding farmers in easily watering their crops.

While these irrigation systems have been crucial in crop production and sustainability, they are not without deficiencies. Some of these weaknesses stem from the configuration of the irrigation systems. For example, center-pivot systems are often limited to travelling in a circle, which leaves corners of a field that will not be reached by the sprinklers on the center pivot. Or, hand lines may not be able to be placed in oddly shaped parts of a field. With water not reaching certain portions of a field, farmers may lose a lot of money due to a lack of crop growth or no crop growth in those sections.

Accordingly, there is a need for an apparatus that can water sections of a field where current systems of irrigation are not capable of or have a difficult time reaching. The present invention seeks to solve these and other problems.

SUMMARY OF EXAMPLE EMBODIMENTS

In one embodiment, a corner-sprinkler apparatus comprises a first wheel, a second wheel, a first member interposed between the first and second wheels, a first bracket coupled to the first member, and a second member with a second bracket, the second member may be perpendicular to the first member. The first wheel may include a first rim, a plurality of first spokes that extend at an angle from an inner surface of the first rim to a first plate on an outer side of the first wheel and at an angle from the inner surface of the first rim to a second plate on an inner side of the first wheel. Interposed between the first plate and the second plate may be a first shaft that is coupled to an inner surface of both of the first and second plates. An axle may be placed in the first shaft and extend through the first member. The second wheel may include a second rim, a plurality of second spokes that extend at an angle from an inner surface of the second rim to a third plate on an outer side of the second wheel and at angle from an inner surface of the second rim to a fourth plate on an inner side of the second wheel. Interposed between the third plate and the fourth plate may be a second shaft that is coupled to an inner surface of both of the third and fourth plates. Positioned within the second shaft may be the axle that may pass through the entirety of the first member to the first wheel.

The first member may house the axle as previously discussed. The first bracket may be coupled to an upper surface of the first member. The first bracket may be configured to receive and secure the second member via the second bracket. The second bracket may be coupled to the second member and be similar to the first bracket.

In one embodiment, a corner-sprinkler apparatus comprises a first wheel, a second wheel, a first member with a first arm and a second arm that descend therebelow, a bracket coupled to the first member, and a second member coupled to the bracket and perpendicular to the first member. The first wheel may include a first tire with a first rim. Likewise, the second wheel may include a second tire with a second rim.

The first arm may be at a first end of the first member and the second arm may be at a second end of the first member. The bracket may be coupled to an upper surface of the first member. The bracket may include an upper section and a lower section. The bracket may be configured to receive and secure the second member.

The second member may include an upper portion and a lower portion. The upper portion may include an upper pipe that extends vertically from the first member and the bracket. The upper pipe end that is distal from the first member and the bracket may be a first receiving end. The first receiving end may receive a sprinkler head. The lower portion may include a first lower pipe and a second lower pipe. The second lower pipe at an end opposite connection to the first lower pipe may include a second receiving end. The second receiving end may receive a water hose or pipe.

DETAILED DESCRIPTION OF EXAMPLE EMBODIMENTS

Figure 1:
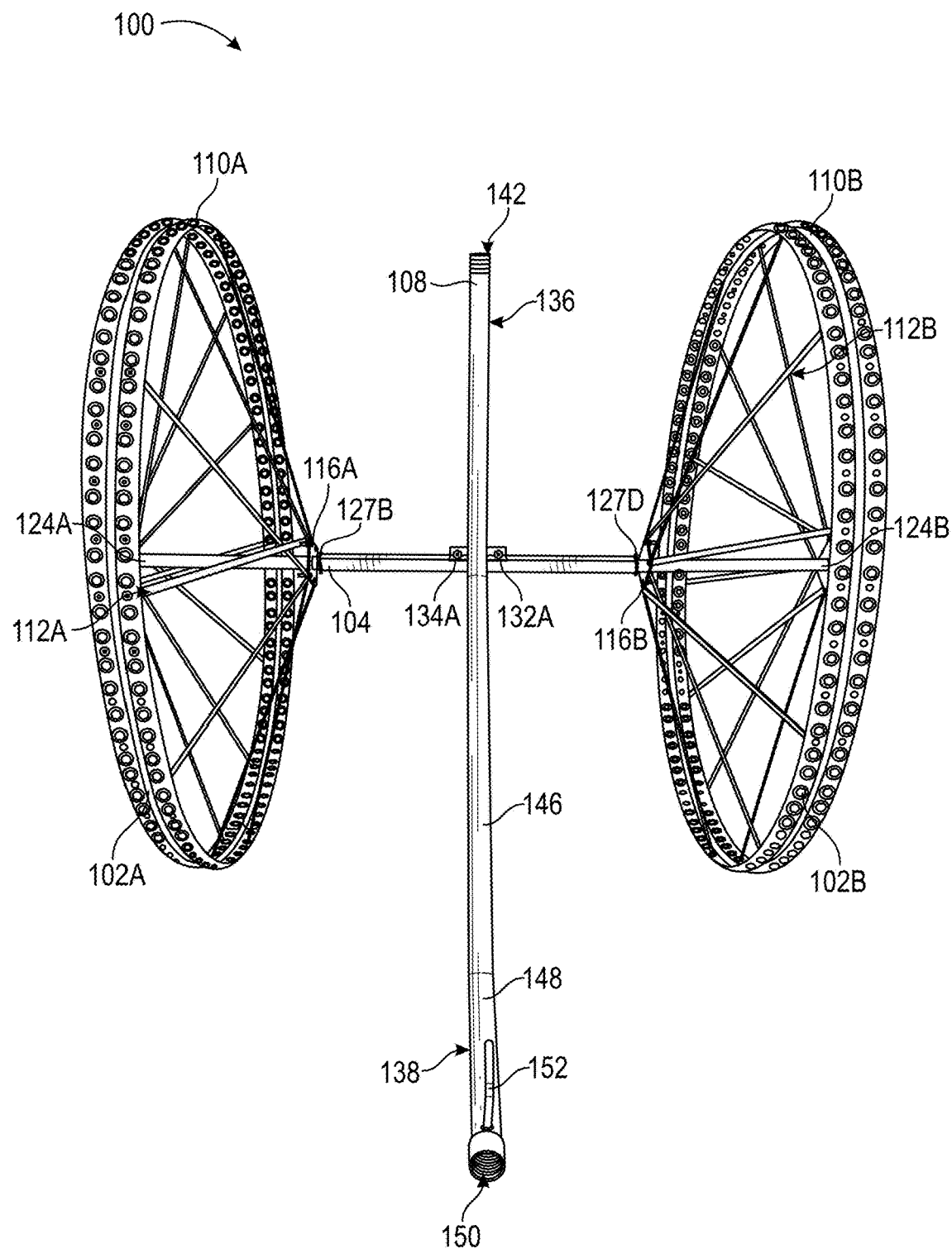
FIG. 1 illustrates a front perspective view of a corner-sprinkler apparatus.
Figure 2:
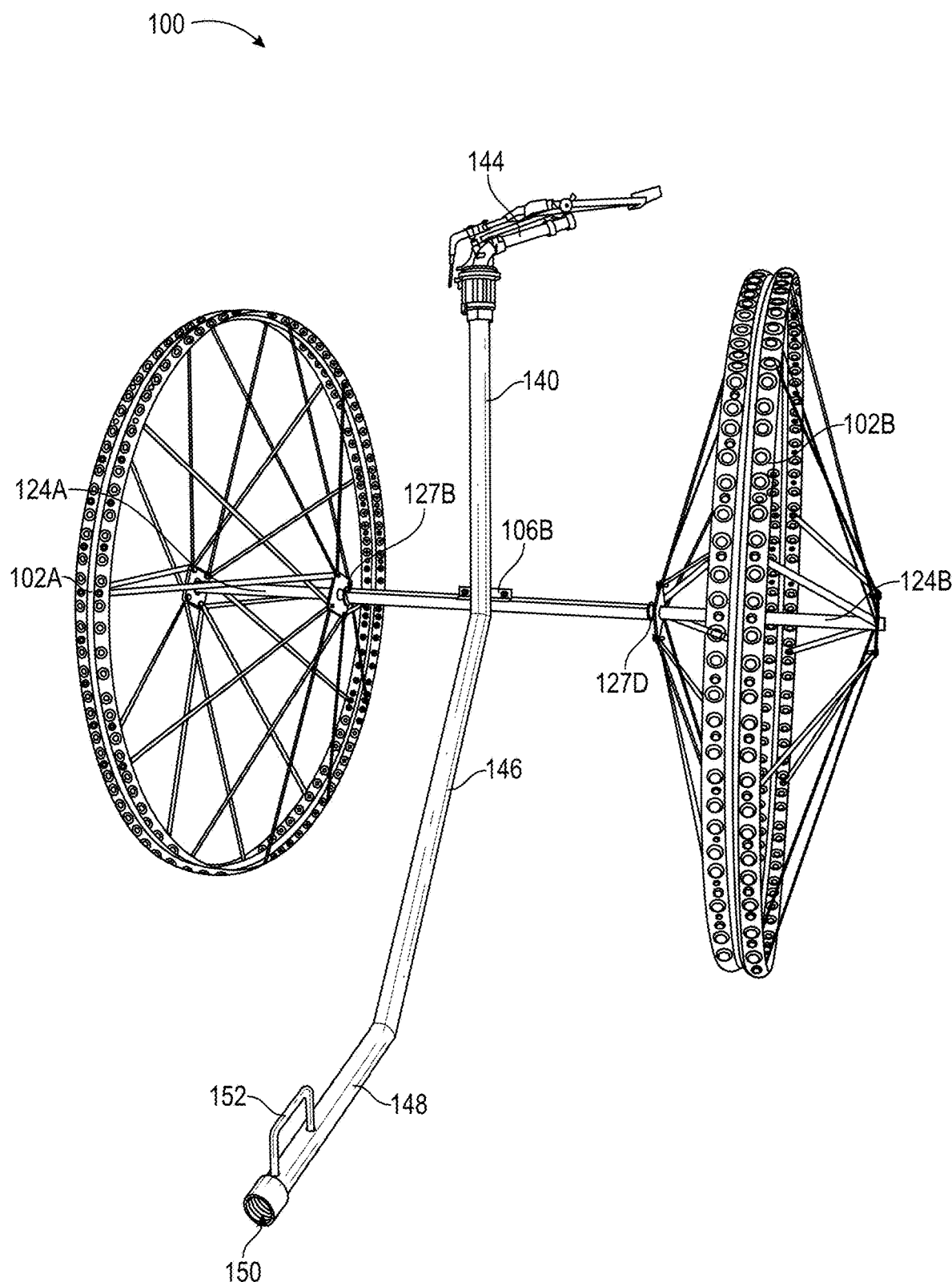
FIG. 2 illustrates a perspective view of a corner-sprinkler apparatus.
Figure 3:
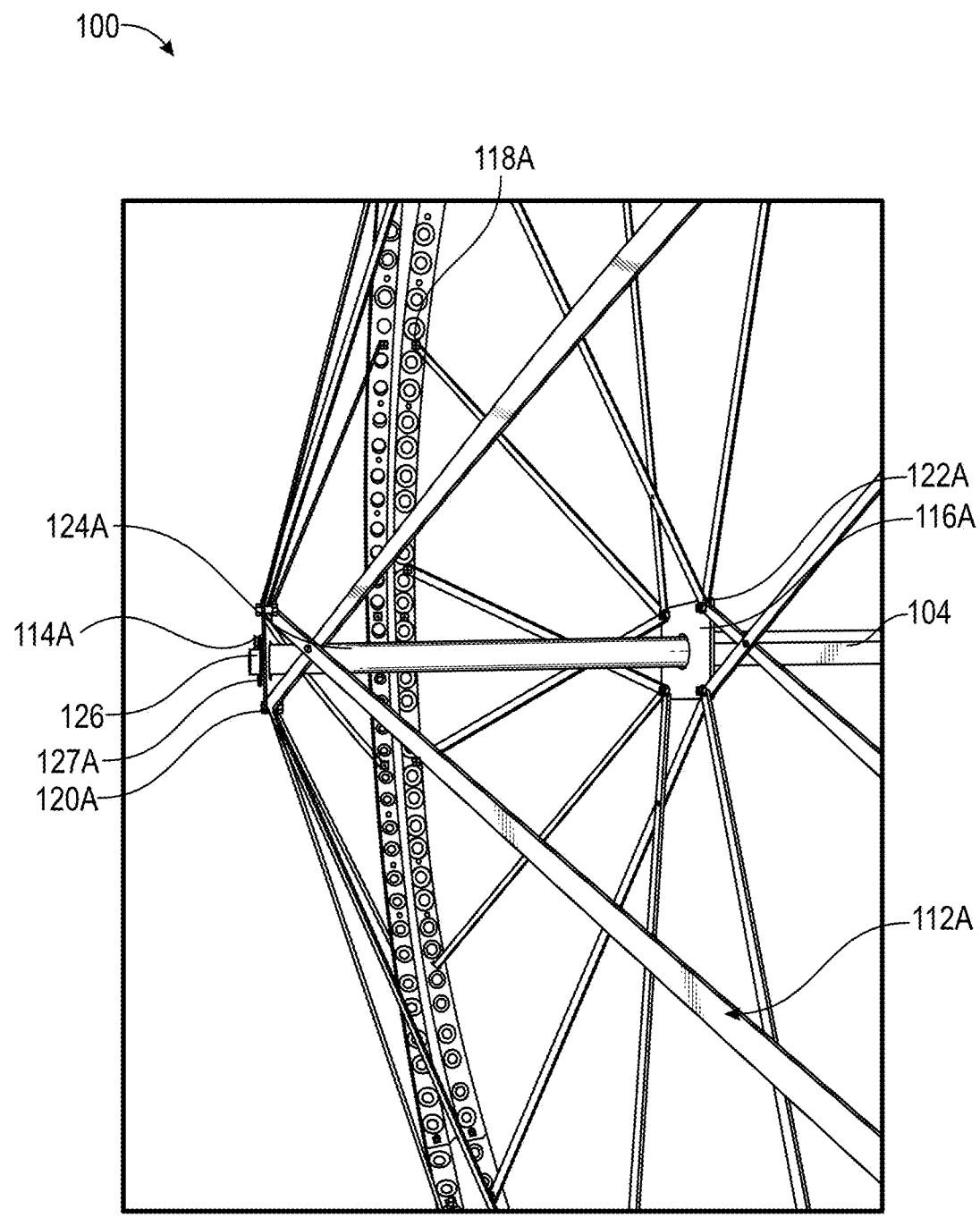
FIG. 3 illustrates a left-side perspective view of a wheel of a corner-sprinkler apparatus.
Figure 4:
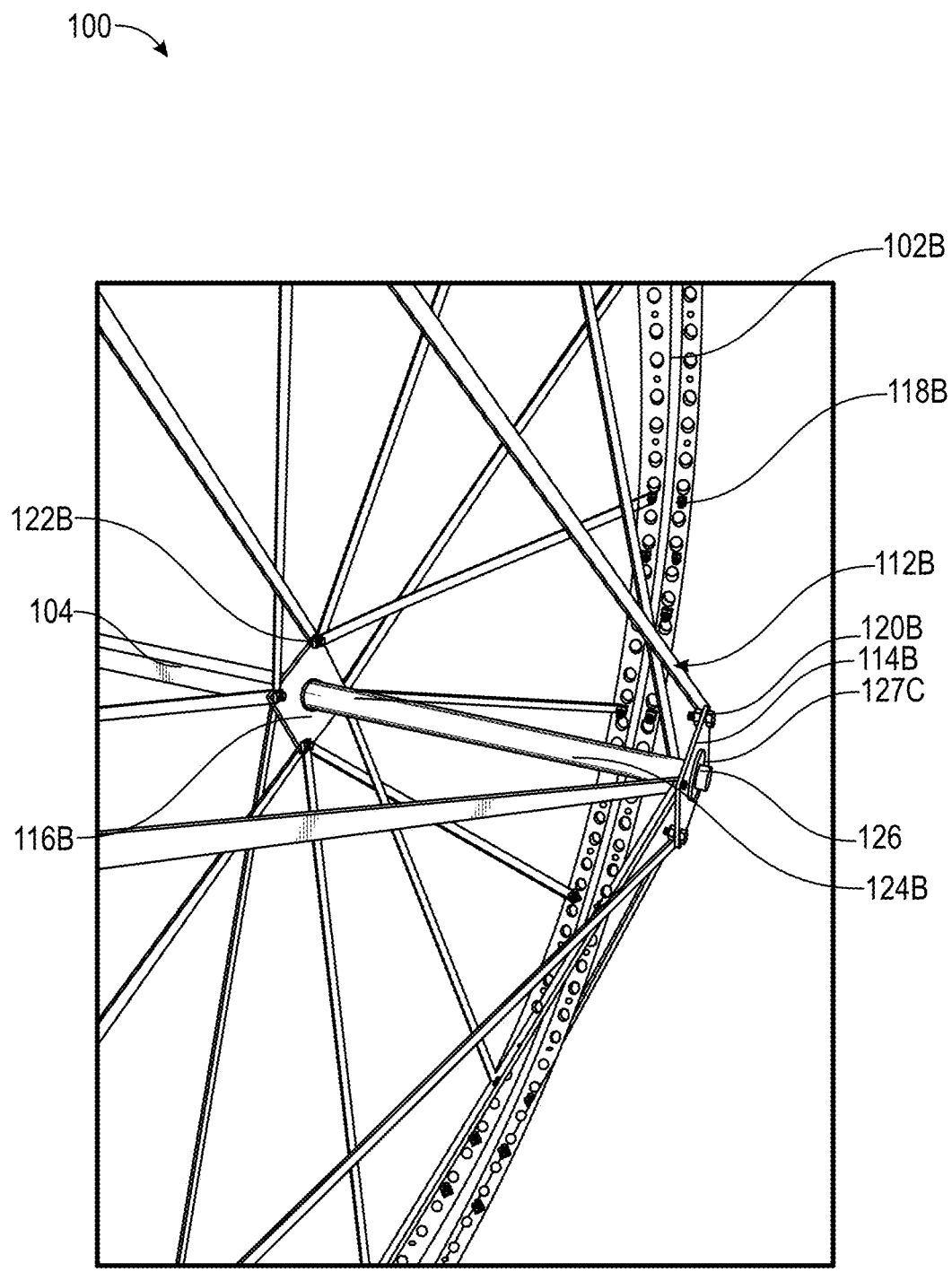
FIG. 4 illustrates a right-side perspective view of a wheel of a corner-sprinkler apparatus.
Figure 5:
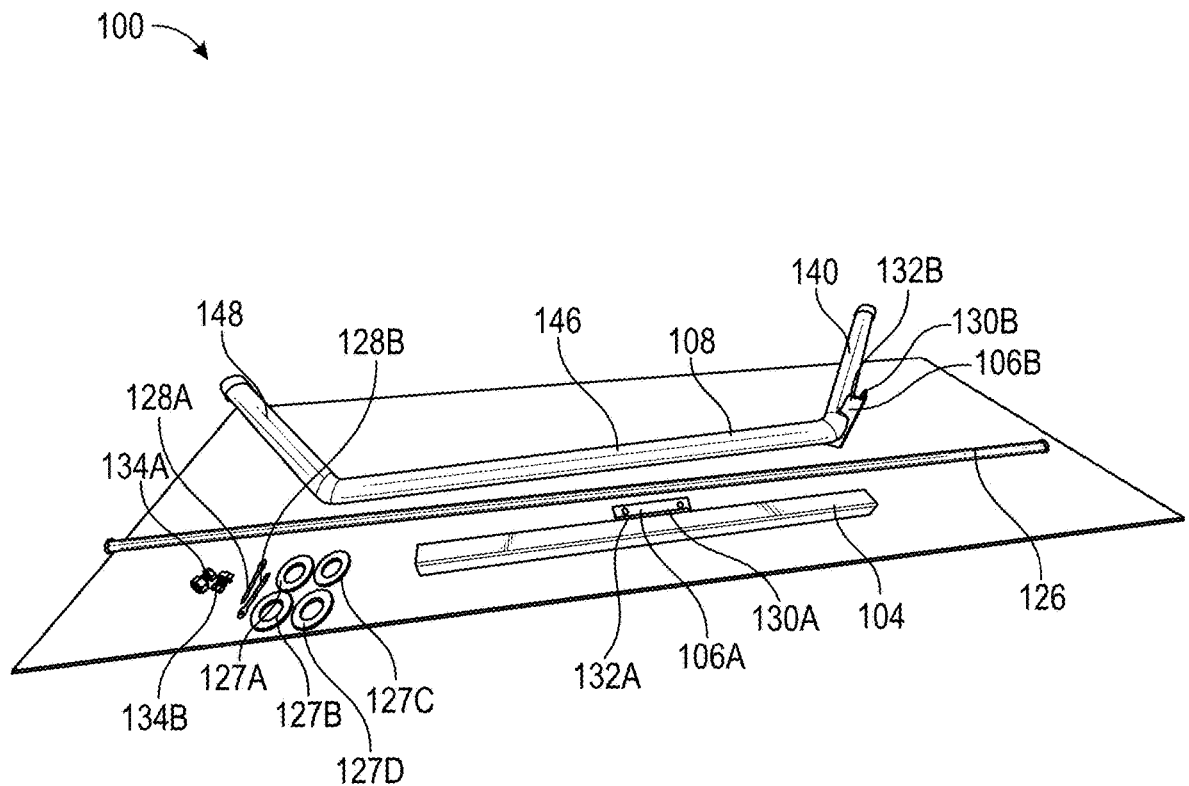
FIG. 5 illustrates a perspective view of the components disassembled of a corner-sprinkler apparatus.

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed. Rather, the present disclosure will cover all modifications, equivalents, and alternatives falling within the scope of the present disclosure.

It will be understood that the detailed description depicts only example embodiments, which are not to be considered limiting in scope. Reference to the invention, the present disclosure, or the like are not intended to restrict or limit the invention, the present disclosure, or the like to exact features or steps of any one or more of the exemplary embodiments disclosed herein. References to "one embodiment," "an embodiment," "various embodiments," and the like, may indicate that the embodiment(s) so described may include a particular feature, structure, or characteristic, but not every embodiment necessarily includes the particular feature, structure, or characteristic. In addition, repeated use of the phrase "in one embodiment" or "in an embodiment" does not necessarily refer to the same embodiment, although they may refer to the same embodiment.

The particular arrangements disclosed herein are meant to be illustrative only and not limiting as to the scope of the invention. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described.

It will be understood that the steps of any such processes or methods are not limited to being carried out in any particular sequence or arrangement. In fact, the steps of the disclosed processes or methods generally may be carried out in various different sequences and arrangements while still falling within the scope of the present invention.

The terms "comprising," "including," "having," and the like, as used with respect to embodiments, are synonymous, and are generally intended as "open" terms.

As previously discussed, there is a need for an apparatus that can water sections of a field where current systems of irrigation are not capable of or have a difficult time reaching. The present invention seeks to solve these and other problems.

For humanity to survive, irrigation needs to be occurring throughout the world. There are many means to irrigate crops that are used. As an example of some of these methods, farmers rely on flood irrigation via waterways, buckets, sprinklers that are coupled to handline, and center pivots, or wheel lines. All of these methods allow water to be distributed across crops and have been important for increasing crop production for many people. While these irrigation methods have been crucial in crop production and sustainability, they are not without deficiencies. Shortcomings may often be found within the configuration of the irrigation system. Due to the fact that a majority of the fields that are irrigated are not symmetrical, there are portions of these fields that are not easily watered. As an example, center pivots cannot easily reach corners of fields, because they move in circular motions around the center pivot point. Furthermore, hand lines may not be able to be placed in oddly shaped parts of a field. Not watering corners of fields may seem unimportant. However, if this is occurring across many fields, farmers may lose significant amounts of money from not having crops or well-grown crops in these hard-to-reach areas of the fields.

The corner-sprinkler apparatus described herein includes at least two wheels, a first member, and a second member. The corner-sprinkler apparatus may be configured to receive a sprinkler head and a hose. As such, the corner-sprinkler apparatus may be positioned in hard-to-reach sections of a field, where water is not easily placed.

As shown in FIGS. 1-5, in one embodiment, a corner-sprinkler apparatus 100 comprises a first wheel 102A, a second wheel 102B, a first member 104 interposed between the first and second wheels 102A, 102B, a first bracket 106A coupled to the first member 104, and a second member 108 coupled with a second bracket 106B, the second member 108 may be perpendicular to the first member 104.

The first wheel 102A may include a first rim 110A that acts as a tire and contacts the ground (or, in some embodiments, the rim receives a rubber, foam, or other type of tire), a plurality of first spokes 112A that extend at an angle from an inner surface of the first rim 110A to a first plate 114A on an outer side of the first wheel 102A and at an angle from an inner surface of the first rim 110A to a second plate 116A on an inner side of the first wheel 102A. The plurality of first spokes 112A may be coupled to the first rim 110A via first rim couplers 118A, the first plate 114A via first plate couplers 120A, the second plate 116A via second plate couplers 122A. The first rim couplers 118A, the first plate couplers 120A, and the second plate couplers 122A may be bolts and nuts, screws, etc. Interposed between the first plate 114A and the second plate 116A may be a first shaft 124A that is coupled to an inner surface of both of the first and second plates 114A, 116A. Positioned within the first shaft 124A may be an axle 126 that may pass through the entirety of the first member 104 to the second wheel 102B. As the axle 126 extends through the first shaft 124A and outward from an outer surface of the first plate 114A, the axle 126 may receive a first disc 127A (i.e., a washer) that includes an aperture that is close to the circumference of the axle 126 and an end of the axle 126 may receive a pin 128A (e.g., a cotter pin or other types of securement mechanisms) therethrough, that is, through an aperture so as to secure or position the first disc 127A proximate to or in contact with the first plate 114A. As the first shaft 124A extends inward, past the second plate 116A, proximate an end of the first shaft 124A may be a second disc 127B (i.e., a washer), like the first disc 127A, that may be in contact with or proximate to an end of the first member 104 proximate the first wheel 102A. The first and second discs 127A, 127B may be removably attachable.

The second wheel 102B may include a second rim 110B that acts as a tire and contacts the ground (or, in some embodiments, the rim receives a rubber, foam, or other type of tire), a plurality of second spokes 112B that extend at an angle from an inner surface of the second rim 110B to a third plate 114B on an outer side of the second wheel 102B and at an angle from an inner surface of the second rim 110B to a fourth plate 116B on an inner side of the second wheel 102B. The plurality of second spokes 112B may be coupled to the second rim 110B via second rim couplers 118B, the third plate 114B via third plate couplers 120B, the fourth plate 116B via fourth plate couplers 122B. The second rim couplers 118B, the third plate couplers 120B, and the fourth plate couplers 122B may be bolts and nuts, screws, etc. Interposed between the third plate 114B and the fourth plate 116B may be a second shaft 124B that is coupled to an inner surface of both of the third and fourth plates 114B, 116B. Positioned within the second shaft 124B may be the axle 126 that may pass through the entirety of the first member 104 to the first wheel 102A. As the axle 126 extends through the second shaft 124B and outward from an outer surface of the third plate 114B, the axle 126 may receive a third disc 127C (i.e., a washer) that includes an aperture that is close to the circumference of the axle 126 and an end of the axle 126 may receive a pin 128B (e.g., a cotter pin or other types of securement mechanisms) therethrough, that is, through an aperture so as to secure or position the third disc 127C proximate to or in contact with the third plate 114B. As the second shaft 124B extends inward, past the fourth plate 116B, proximate an end of the second shaft 124B may be a fourth disc 127D (i.e., a washer), like the third disc 127C, that may be in contact with or proximate to an end of the first member 104 proximate the second wheel 102B. The third and fourth discs 127C, 127D may be removably attachable. While two wheels are shown, it will be understood that more than two may be used without departing from the present invention. The first and second wheels 102A, 102B may be manufactured out of a light weight material, such as aluminum, or may be made from a heavier material, such as steel. However, it will be appreciated that the first and second wheels 102A, 102B may be manufactured from metal, rubber, plastics, or some combination thereof. The first and second wheels 102A, 102B may move independently of each other so as to increase maneuverability. While one axle is discussed, it will be understood that each wheel may have its own axle.

The first member 104 may house the axle 126 as previously discussed. The first member 104 may be square-tubing. In some embodiments, the first member 104 may be cylindrical tubing or another type of tubing. In other embodiments, the first member 104 may be solid, that is, it may not have openings and the first and second wheels 102A, 102B may couple to ends thereof. The first member 104 may vary in length, width, and height so as to be configurable to various lengths of axles, wheels, and second members. The first member 104 may be manufactured from steel. The first member 104 may also be manufactured from aluminum, plastic, fiberglass, any combination thereof, or any other type of material.

The first bracket 106A may be coupled to an upper surface of the first member 104; however, in other embodiments, the first bracket 106A may be coupled to other surfaces of the first member 104. The first bracket 106A may include a first upper section 130A and a first lower section 132A; the first lower section 132A may be at substantially a 90-degree angle from the first upper section 130A, or the first upper and lower sections 130A, 132A may be at an angle other that generally 90 degrees. The first upper section 130A may include a first bracket fastener 134A and a second bracket fastener 134B that are received in first bracket apertures, and in some embodiments, the first lower section 132A may include fasteners. The first and second bracket fasteners 134A, 134B may be bolts and nuts, screws, clamps, or any other type of fasteners. The first bracket 106A may be manufactured from metal, plastic, fiberglass, or any other type of material. The first bracket 106A may be configured to receive and secure the second member 108 via the second bracket 106B.

The second bracket 106B may be coupled to the second member 108 and be similar to the first bracket 106A. The second bracket 106B may include a second upper section 130B and a second lower section 132B; the second lower section 132B may be at substantially a 90-degree angle from the upper second section 130B, or the second upper and lower sections 130B, 132B may be at an angle other than generally 90 degrees. The second upper section 130B may receive the first bracket fastener 134A and the second bracket fastener 134B that are received in second bracket apertures, and in some embodiments, the second lower section 132B may include fasteners. The second bracket 106B may be manufactured from metal, plastic, fiberglass, or any other type of material. In particular, the second upper section 130B may align or interact with the first upper section 130A, wherein the first and second bracket fasteners 134A, 134B pass through the first and second upper sections 130A, 130B so as to couple the first member 104 to the second member 108.

The second member 108 may include an upper portion 136 and a lower portion 138. The upper portion 136 may include an upper pipe 140 that extends vertically from the first member 104. The upper pipe 140 may receive the second bracket 106B. The upper pipe 140 end that is distal from the first member 104 may be a first receiving end 142. The first receiving end 142 may be threaded on an outer surface (or inner surface) to receive a sprinkler head 144. As such, the sprinkler head 144 may be removably attachable to the first receiving end 142. While the first receiving end 142 may be threaded, in some embodiments, the first receiving end 142 may be configured to receive various clamps or other fastening mechanism, whether removably attachable or permanent, to receive the sprinkler head 144. The lower portion 138 may include a first lower pipe 146 and a second lower pipe 148. The first lower pipe 146 is connected to the upper pipe 140 at one end and the second lower pipe 148 at an opposite end. The first lower pipe 146 may be at an obtuse angle to the upper pipe 140, and the second lower pipe 148 may be at an obtuse angle to the first lower pipe 146. The second lower pipe 148 is at an angle to rest on the ground so as to add stability to the apparatus 100. The second lower pipe 148 at an end opposite connection to the first lower pipe 146 may include a second receiving end 150. The second receiving end 150 may have a greater circumference than the second lower pipe 148 or may be the same circumference. The second receiving end 150 may be threaded to receive a water hose or pipe, with the threads being on an inner surface (or on an outer surface). In other embodiments, the second receiving end 150 may include clamps, hooks, or other types of fastening mechanism to secure a water hose or pipe. On an upper surface of the second lower pipe 148, there may be a handle 152 that extends upward so as to allow a user to grasp and transport and roll the corner-sprinkler apparatus 100 to a desired location. While pipes are shown, it will be appreciated that other shapes or types of tubing may be used.

Figure 6:
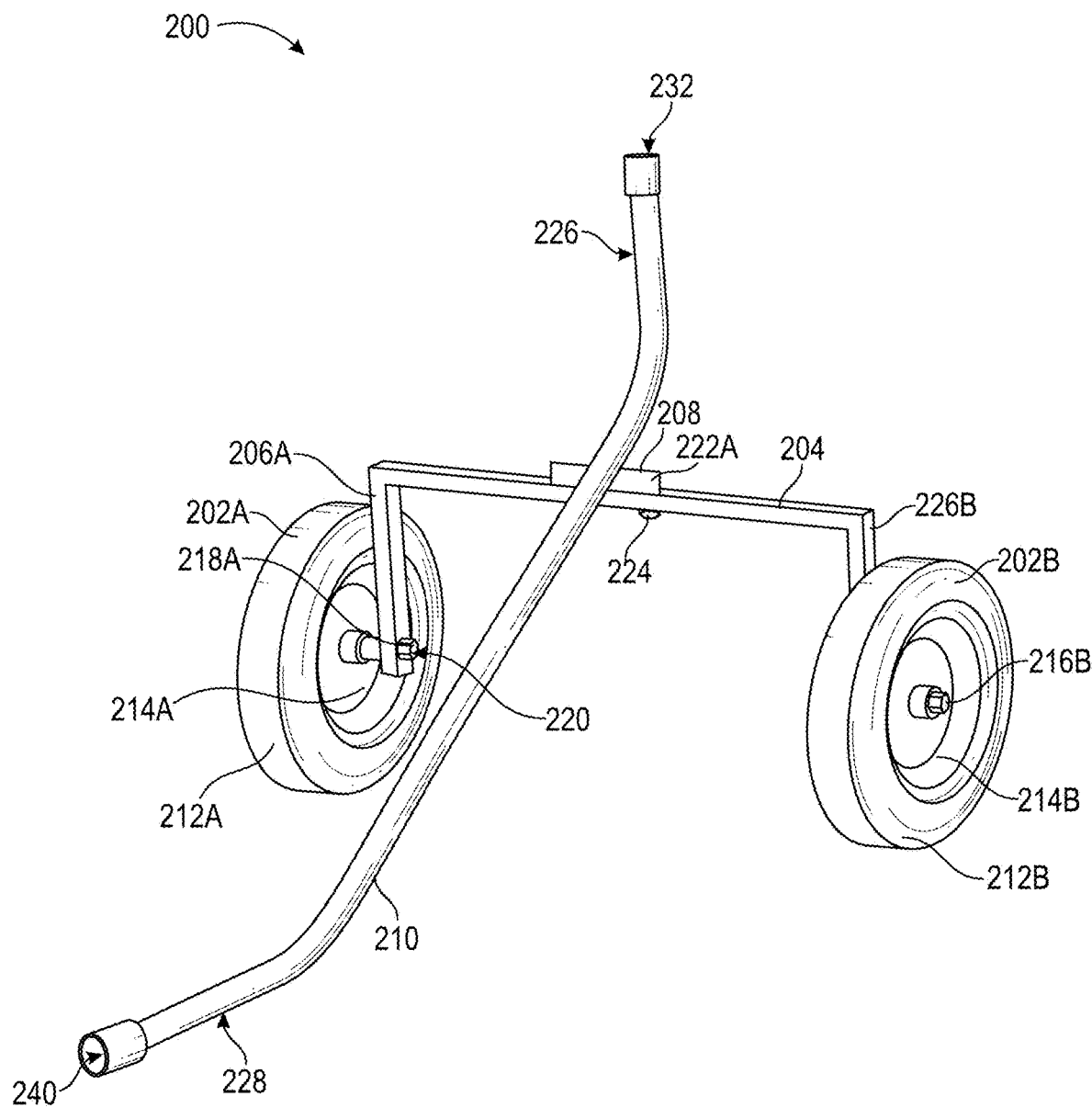
FIG. 6 illustrates a perspective view of a corner-sprinkler apparatus.
Figure 7:
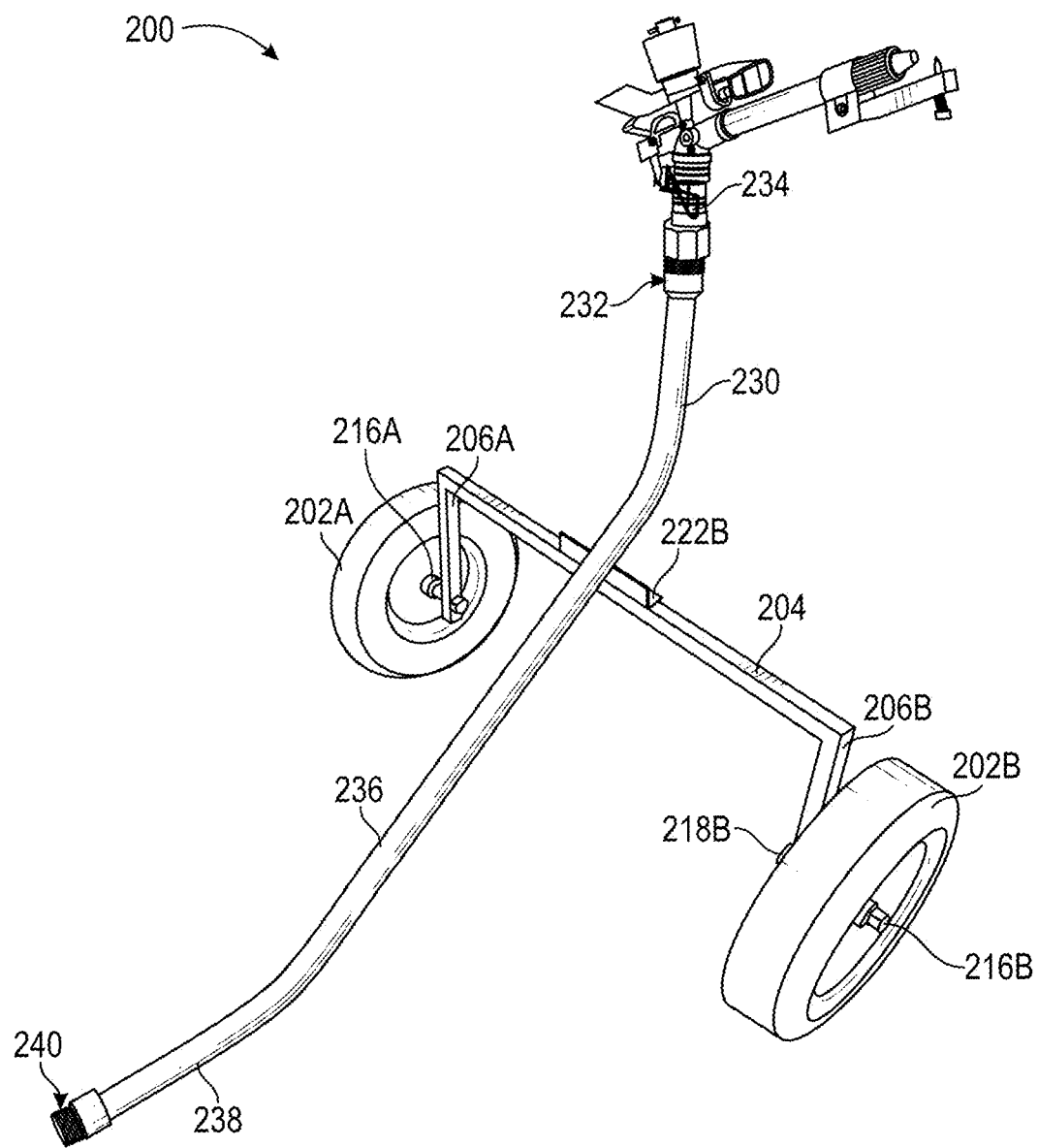
FIG. 7 illustrates a perspective view of a corner-sprinkler apparatus.

As shown in FIGS. 6-7, in one embodiment, a corner-sprinkler apparatus 200 comprises a first wheel 202A, a second wheel 202B, a first member 204 with a first arm 206A and a second arm 206B that descend therebelow, a bracket 208 coupled to the first member 204, and a second member 210 coupled to the bracket 208 and perpendicular to the first member 204.

The first wheel 202A may include a first tire 212A with a first rim 214A. The first tire 212A may be coupled to the first arm 206A via a first axle 216A and first fasteners 218A. Likewise, the second wheel 202B may include a second tire 212B with a second rim 214B. The second tire 212B may be coupled to the second arm 206B via a second axle 216B and second fasteners 218B. While two wheels 202A, 202B are shown, it will be understood that more than two may be used without departing from the present invention. The first and second wheels 202A, 202B may be manufactured from metal, rubber, foam, plastic, some combination thereof, or any other type of tire and wheel material known in the art. The first and second wheels 202A, 202B may move independently of each other so as to increase maneuverability.

The first arm 206A may be at a first end of the first member 204 and the second arm 206B may be at a second end of the first member 204. The first and second arms 206A, 206B may both be at generally a 90-degree angle from the first member 204, descending downward. The first arm 206A may include a first aperture 220 that is configured to receive the first axle 216A, and the second arm 206B may include a second aperture (not shown, but same as the first aperture 220) that is configured to receive the second axle 216B. The first member 204 with the first arm 206A and the second arm 206B may be square-tubing. In some embodiments, the first member 204 and arms 206A, 206B may be cylindrical tubing or another type of tubing. In other embodiments, the first member 204 and arms 206A, 206B may be solid, that is, it may not have openings and the first and second wheels 202A, 202B may couple to ends thereof. The first member 204 with the arms 206A, 206B may vary in length, width, and height so as to be configurable to various lengths of axles, wheels, and second members. The first member 204 may be manufactured from steel. The first member 204 may also be manufactured from aluminum, plastic, fiberglass, any combination thereof, or any other type of material.

The bracket 208 may be coupled to an upper surface of the first member 204; however, in other embodiments, the bracket 208 may be coupled to other surfaces of the first member 204. The bracket 208 may include an upper section 222A and a lower section 222B; the lower section 222B may be at substantially a 90-degree angle from the upper section 222A. The lower section 222B may include bracket fasteners 224, and in some embodiments, the upper section 222A may include fasteners. The bracket fasteners 224 may be bolts and nuts, screws, clamps, or any other type of fasteners. The bracket 208 may be manufactured from metal, plastic, fiberglass, or any other type of material. The bracket 208 may be configured to receive and secure the second member 210 to the first member 204.

The second member 210 may include an upper portion 226 and a lower portion 228. The upper portion 226 may include an upper pipe 230 that extends vertically from the first member 204 and the bracket 208. The upper pipe 230 end that is distal from the first member 204 and the bracket 208 may be a first receiving end 232. The first receiving end 232 may be threaded on an outer or inner surface to receive a sprinkler head 234. The first receiving end 232 may have a greater circumference than the upper pipe 230, or may be the same circumference. As such, the sprinkler head 234 may be removably attachable to the first receiving end 232. While the first receiving end 232 may be threaded, in some embodiments, the first receiving end 232 may be configured to received various clamps or other fastening mechanisms, whether removably attachable or permanent, to receive the sprinkler head 234. The lower portion 228 may include a first lower pipe 236 and a second lower pipe 238. The first lower pipe 236 is connected to the upper pipe 230 at one end and the second lower pipe 238 at an opposite end. The first lower pipe 236 may be at an obtuse angle to the upper pipe 230, and the second lower pipe 238 may be at an obtuse angle to the first lower pipe 236. The second lower pipe 238 is at an angle to rest on the ground. The second lower pipe 238 at an end opposite connection to the first lower pipe 236 may include a second receiving end 240. The second receiving end 240 may have a greater circumference than the second lower pipe 238, or in other embodiments, the second receiving end 240 may be in line or the same diameter as the second lower pipe 238. The second receiving end 240 may be threaded to receive a water hose or pipe. In other embodiments, the second receiving end 240 may include clamps, hooks, or other types of fastening mechanism to secure a water hose or pipe. While pipes are shown, it will be appreciated that other shapes or types of tubing may be used in the apparatus 200.

It will be appreciated that the corner-sprinkler apparatus 100, 200 may be transported and placed so as to provide water to hard-to-reach areas of fields. Accordingly, the corner-sprinkler apparatus 100, 200 may help farmers increase crop production and ultimately, income. Furthermore, the corner-sprinkler apparatus 100, 200 may be light weight so as to be easily moved.

It will be understood that while various embodiments have been disclosed herein, other embodiments are contemplated. Further, systems and/or methods according to certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure.

What is claimed is:
1. A corner-sprinkler apparatus comprising:
a first wheel comprising:
  a first rim,
  a first shaft,
  a first plate coupled to an outer side of the first shaft,
  a second plate coupled to an inner side of the first shaft,
  a plurality of first spokes extending from an inner surface of the first rim to the first plate and the second plate;
a second wheel comprising:
  a second rim,
  a second shaft,
  a third plate coupled to an outer side of the second shaft,
  a fourth plate coupled to an inner side of the second shaft,
  a plurality of second spokes extending from an inner surface of the second rim to the third plate and the fourth plate;
a first member interposed between the first wheel and the second wheel, the first member comprising a first bracket that comprises a first upper section and a first lower section;
a second member perpendicular to and coupled to the first member, the second member comprising:
  an upper pipe,
  a first lower pipe directly coupled to the upper pipe at an obtuse angle,
  a second lower pipe directly coupled to the first lower pipe at an obtuse angle, the second lower pipe rests on the ground and stabilizes the corner-sprinkler apparatus,
  wherein the upper pipe, the first lower pipe, and the second lower pipe, create a single pipe, and
  a second bracket that comprises a second upper section and a second lower section, wherein the second upper section contacts the first upper section and the second lower section contacts the first lower section, wherein the second bracket is the same shape as the first bracket and is nestable and mates with the first bracket, securing the second member to the first member;
an axle extending from the first plate and the third plate;
a first disc in contact with an outer surface of the first plate;

a second disc in contact with a first end of the first member proximate the first wheel;
a third disc in contact with an outer surface of the third plate;
a fourth disc in contact with a second end of the first member proximate the second wheel;
 wherein the second member receives a sprinkler head on the upper pipe and a water hose on the second lower pipe.

\* \* \* \* \*